Jan. 23, 1968    G. H. MAVRAKIS    3,364,615
FISHING CREEL
Original Filed Oct. 16, 1964    2 Sheets-Sheet 1
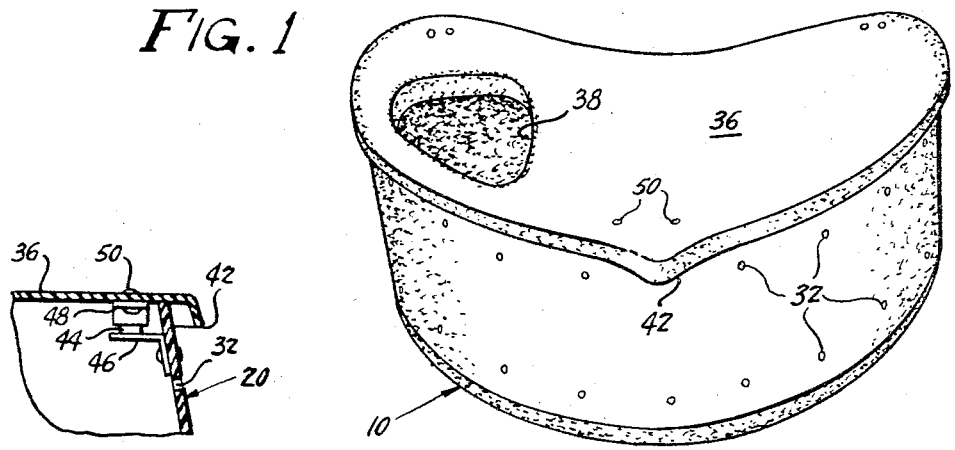
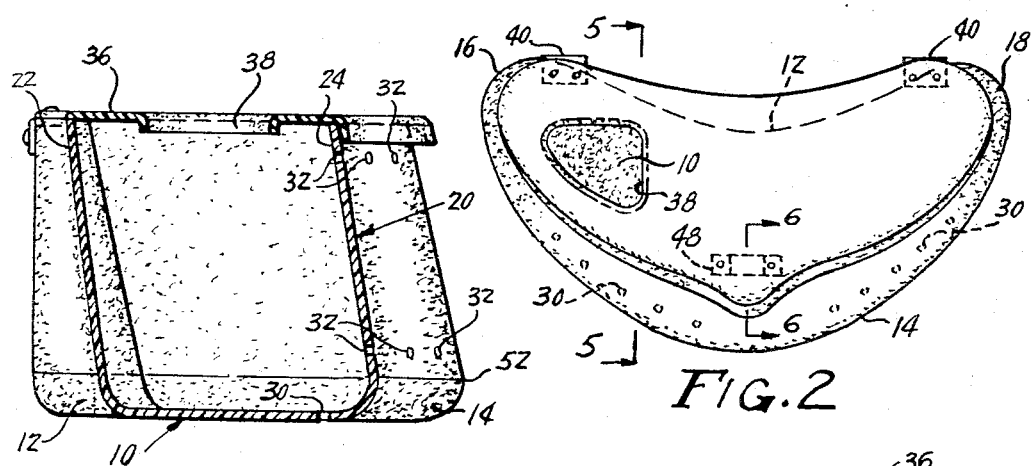
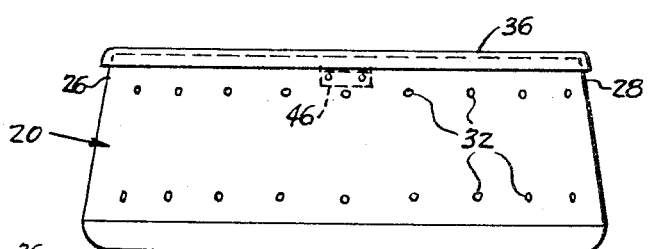
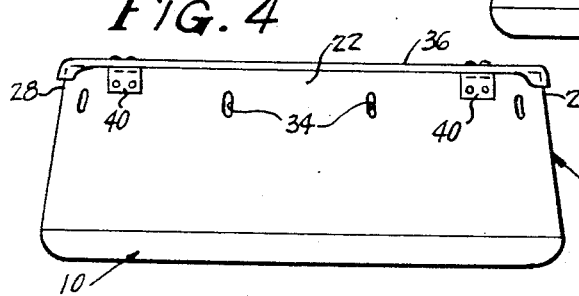
INVENTOR.
GUS H. MAVRAKIS
BY Kimmel & Crowell
ATTORNEYS.

Jan. 23, 1968   G. H. MAVRAKIS   3,364,615
FISHING CREEL
Original Filed Oct. 16, 1964   2 Sheets-Sheet 2
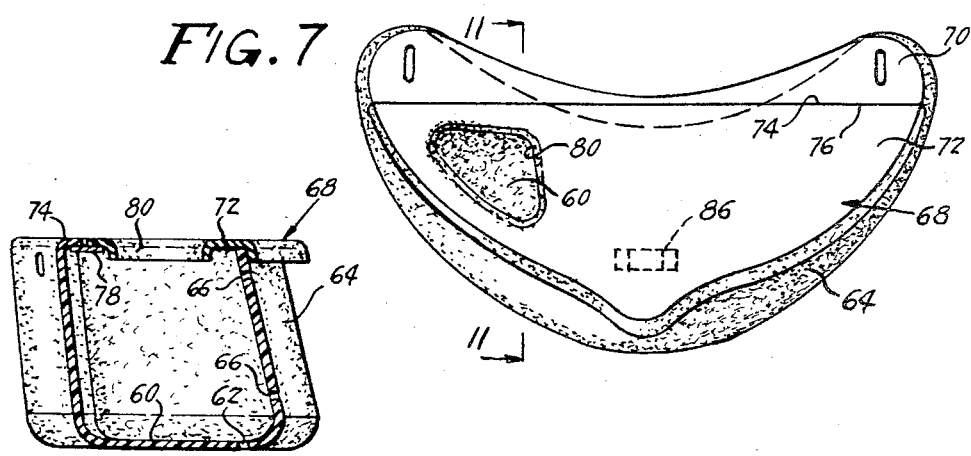
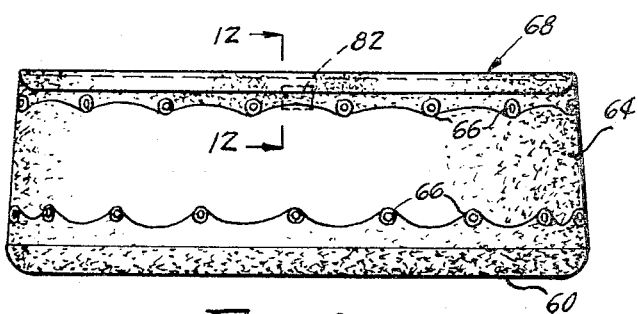
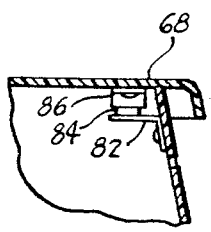
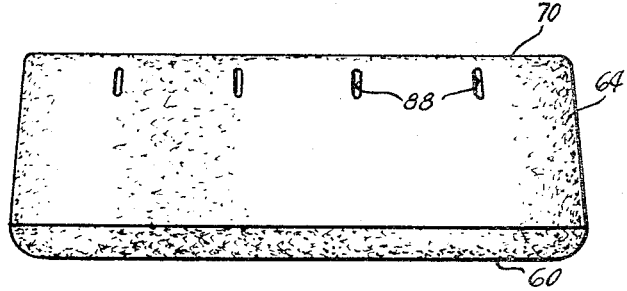
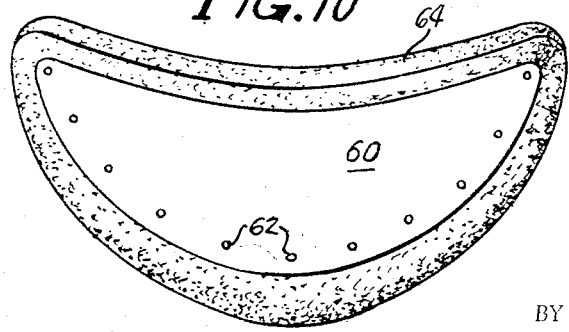
INVENTOR.
GUS H. MAVRAKIS
BY Kimmel & Crowell
ATTORNEYS.

United States Patent Office 3,364,615
Patented Jan. 23, 1968

3,364,615
FISHING CREEL
Gus H. Mavrakis, Billings, Mont., assignor to Denver Creel, Inc., a corporation of Montana
Continuation of application Ser. No. 404,436, Oct. 16, 1964. This application Dec. 30, 1966, Ser. No. 606,450
1 Claim. (Cl. 43—55)

This application is a continuation of my copending, now abandoned application Ser. No. 404,436 filed Oct. 16, 1964 and entitled, Fishing Creel.

The present invention relates to fishing creels generally and in particular to a unitary structure in a fishing creel fabricated of lightweight molded material in set condition.

An object of the present invention is to provide an extremely lightweight fishing creel of new and novel structure, one having exceptionally strong walls and bottom, one fabricated of moldable material such as Styrofoam or the like, one which has drainage holes keeping the interior free of excess water and one which is economical to manufacture.

Another object of the present invention is to provide a fishing creel of novel construction in which the material used is relatively strong, is buoyant, and is designed to keep the fish in top condition when placed therein.

A further object of the present invention is to provide a fishing creel which is designed for wearing about the hip or lower abdomen of an individual, one which is shaped to fit the contour of a human body so as to provide comfort while worn, one which has a cover easily moved from the closing position to an open position with releasable latch means to hold the same in the closed position, and one which may be manufactured by a molding process at reasonable cost.

These and other objects will be apparent from the following description when taken in connection with the drawings, in which:

FIG. 1 is a front perspective view of the creel of the present invention showing the top and front, FIG. 2 is a top plan view, FIG. 3 is a front elevational view, FIG. 4 is a rear elevational view, FIG. 5 is a view taken on the line 5—5 of FIG. 2 and on an enlarged scale, FIG. 6 is a view on an enlarged scale taken on the line 6—6 of FIG. 2, FIG. 7 is a top plan view of a modified form of the invention, FIG. 8 is a front elevational view of the form of the invention shown in FIG. 7, FIG. 9 is a rear elevational view, FIG. 10 is a bottom plan view, FIG. 11 is a view on an enlarged scale, taken on the line 11—11 of FIG. 7, and FIG. 12 is a view on an enlarged scale taken on the line 12—12 of FIG. 8.

With reference to the drawings in which like numerals indicate like parts throughout the several views, in FIGURES 1 to 6, inclusive, a first form of the invention is shown in which there is a solid bottom 10 of crescent shape having a concave inner edge 12 and a convex outer edge 14 with curved end edges 16 and 18 connecting the ends of the inner edge 12 and outer edge 14 together.

The bottom 10 is formed integrally with a continuous wall 20 which rises from the perimeter of the bottom 10.

As shown most clearly in FIG. 5, the portion of the wall 20 above and contiguous with the inner edge 12 of the bottom 10 projects outwardly from the inner edge 12, as at 22.

Also seen in FIG. 5 the portion of the wall 20 above and adjacent to the outer edge 14 slopes inwardly as at 24.

As will be seen most clearly in FIGURES 3 and 4 the portions of the wall 20 above and contiguous with the end edges 16 and 18 of the bottom 10 slope inwardly as at 26 and 28, respectively.

The bottom 10 is provided with a plurality of spaced apertures 30 as shown in FIGURES 2 and 5, in FIG. 2, they being represented in dotted lines. The portion of the wall adjacent to the outer edge 14 is also provided with spaced apertures at the lower end and adjacent to the upper end as at 32.

The rear wall portion, as at 22 in FIG. 4 is provided with a plurality of spaced elongated slots or apertures 34 for the insertion therethrough of strap elements of a body engaging harness (not shown).

A cover 36 extends over the upper end of the wall 20 and is provided with a hand hole 38 having an inwardly curved perimetric lip. The cover 36 is connected to the wall 20 by means of a pair of hinges 40, the cover being conformably shaped to fit the upper portion of wall 20 with the exception that in the front the cover 36 projects outwardly as at 42 to provide a handle for opening and closing the cover 36.

Releasable latch means is provided for holding the cover 36 when in the closed position and this is shown in detail in FIG. 6. It consists of a magnet element 44 mounted on a bracket 46 riveted to the wall 20 and another magnetic element or magnetizable material piece 48 mounted by a rivet 50 to the cover 36.

It will be noted that the wall 20 and bottom 10 are curved where they join as at 52 in FIG. 5 with a demarcation line between the curved portion and the wall 20 which provides for a neat and attractive appearance to the creel of the present invention.

With reference to FIGURES 7 to 12, inclusive, a second form of the invention is shown in which the construction is similar to that shown in FIGURES 1 to 6, inclusive. In this form of the invention the bottom is designated by the numeral 60 as is shown in FIGURE 10. The bottom 60 is provided with the plurality of spaced holes 62 for drainage of the interior of the creel. The wall 64 which rises from the bottom 60 is provided with spaced holes 66 for ventilation of the interior of the creel. A cover 68 extends over the upper end of the wall 64 and is formed in the first section 70 and a second section 72. The first section 70 extends over a portion of the wall 64 adjacent the concave portion of such wall and is provided with a straight edge as at 74 in FIGURE 7. The second section 72 of the cover 68 is also provided with a straight edge adjacent to the edge 74, as at 76 and the section 72 is hinged to the section 70 along the matching straight edges, the hinges being shown in FIG. 11 at 78.

The cover 68 is provided with a hole 80 having an inwardly curved perimetric lip and through which fish are inserted after they are caught. A similar latch means is shown in FIG. 12 in which there is a bracket 82 supporting a magnetic element 84 which is engageable by a magnetizable material piece 86 when the cover 68 is in the closed position.

The back wall of the creel is provided by the elongated slots as at 88 for the insertion therethrough of straps for supporting the creel of the present invention about the body of the person, such harnesses being conventional.

It will be seen therefore that the creel of the present invention in each of its forms lends itself to manufacture by molding out of lightweight foam-type of plastic or the like. The creel as constructed is lightweight, buoyant when allowed to rest on the surface of a body of water, is easy to clean, is ventilated and retains the fish in fresh condition due to its insulating qualities, and is exceptionally comfortable when worn against the hip or lower abdomen of the fisherman.

While only preferred forms of the invention are shown and described other forms are contemplated and numerous changes or modifications may be made in the invention without departing from the spirit thereof as set forth in the appended claim.

I claim:

1. A fishing creel comprising a unitary body fabricated of lightweight buoyant moldable foamed plastic material in set condition including a flat bottom of crescent shape including a concave rear edge contoured to the body of a wearer and a convex front edge, with its ends intersecting the ends of said concave edge, a unitary upstanding wall integral with said flat bottom including a concaved rear wall portion conforming to said rear edge inclined in a rearward upward direction, arcuate integral end wall portions inclined upwardly toward each other, and an integral arcuate front wall portion inclined upwardly and rearwardly and conforming to said convex edge, an L-shaped metal lug secured to the interior of the top of the center of said front wall, a cover member of moldable plastic hinged to said rear wall, a permanent magnet secured to the underside of said cover engageable with said metal lug, said cover having an outwardly bowed central front portion affording a finger grip, said flat bottom and said front wall having drainage openings therein, said rear wall having slots therein to accommodate the strap of a harness, and said cover having an opening provided with an inwardly curved perimetric lip integrally molded therein to permit fish to be inserted into said creel.

References Cited

UNITED STATES PATENTS

| | | | |
|---|---|---|---|
| 1,388,187 | 8/1921 | Marble | 43—54.5 |
| 2,899,103 | 8/1959 | Ebert | 43—55 X |
| 1,076,542 | 10/1913 | Balch | 43—55 |
| 1,140,625 | 5/1915 | Spitzler | 43—55 |
| 1,465,814 | 8/1923 | Forsburg | 43—55 |
| 2,508,305 | 5/1950 | Teetor | 292—70 |
| 2,566,719 | 9/1951 | Dick | 43—55 X |
| 2,605,581 | 8/1952 | Kranitz | 43—55 |

SAMUEL KOREN, *Primary Examiner.*

WARNER H. CAMP, *Examiner.*